United States Patent [19]
Whittingham

[11] 4,025,717
[45] May 24, 1977

[54] HIGH VOLTAGE SHIELDED CABLE SPLICE

[76] Inventor: William F. Whittingham, 6029 Primrose Ave., No. 1, Temple City, Calif. 91780

[22] Filed: May 7, 1975

[21] Appl. No.: 575,221

[52] U.S. Cl. .............................. 174/88 C; 156/49; 174/76; 174/84 R

[51] Int. Cl.² ...................... H01R 5/02; H02G 1/14

[58] Field of Search ............... 174/88 R, 88 C, 91, 174/93, 84 R, 76, 77 R, 21 R, 21 C, 22 R, 22 C; 156/49, 48; 29/628

[56] References Cited

UNITED STATES PATENTS

| | | | |
|---|---|---|---|
| 2,435,284 | 2/1948 | Lodge | 156/49 X |
| 2,444,075 | 6/1948 | Violett | 156/49 |
| 2,451,868 | 10/1948 | Quackenbush et al. | 174/88 C |
| 2,768,105 | 10/1956 | Dittmore et al. | 174/88 C UX |
| 3,332,813 | 7/1967 | Clarke | 174/88 C X |
| 3,878,317 | 4/1975 | Plaskon | 174/76 X |

FOREIGN PATENTS OR APPLICATIONS 1,110,023   4/1968   United Kingdom ................. 174/76

Primary Examiner—Laramie E. Askin
Attorney, Agent, or Firm—Forrest J. Lilly

[57] ABSTRACT

A splice for a shielded high voltage cable wherein a section of electrical shielding sleeve of the original cable is replaced by an open-mesh sleeve, and the latter is concentrically supported on the connector sleeve by a polyurethane helix. A polyvinyl chloride or other plastic jacket is taped to the cable at its opposite ends, and is filled in with mixed polyurethane plastic material, an epoxy, or the like, which invades the entire interior of the splice, inside the jacket, and inside the open-mesh replacement shielding sleeve as well. The unshielded case is the same, but with the shield and shield replacement step omitted.

3 Claims, 4 Drawing Figures

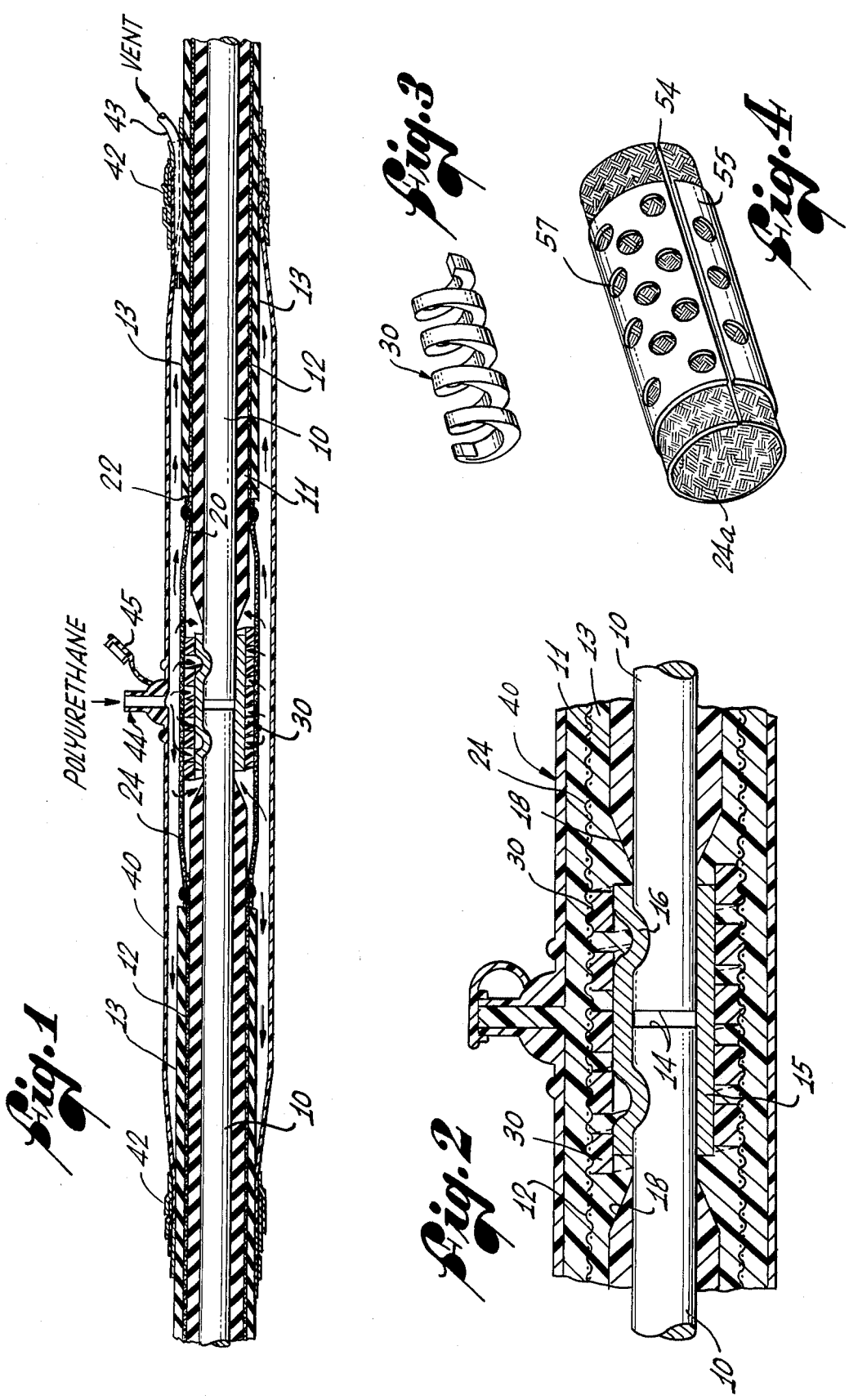

HIGH VOLTAGE SHIELDED CABLE SPLICE

FIELD OF THE INVENTION

This invention relates generally to splices for high-voltage power cable.

BACKGROUND OF THE INVENTION

High voltage shielded cable of the type to which the invention appertains consists of a copper or aluminum conductor which may, as an example, be of the order of one-half inch in diameter. This conductor is surrounded by a conventional sleeve of primary insulation, which in turn may be surrounded by an electrically conductive tubular shield comprised of wire strands, a sleeve of copper or aluminum mesh or a conductive coating. Outside this shield, if used, is an outer cable jacket of insulation material. Conventionally, in splicing such cable, the primary insulation is cut back to expose a section of the copper conductor. The conductive shield material, e.g., conductive screen or braid shielding sleeve, may then be cut back somewhat further, and the outer jacket still further. Various techniques have been used to join these parts in making the splice. Conventionally, the two exposed end portions of a copper conductor are inserted into opposite ends of a clamping sleeve, which is thereafter crimped into the conductors to join the two ends very tightly and permanently. Various arrangements for replacing the cut-away insulation and jacket, and the conductive shielding material, have been in use, beginning with simple taping, and involving various expendients too numerous to mention herein.

The general purpose of the present invention is to provide a cable splice of this general nature, but which has definite and important improvements as regards restoration of the dielectric strength and electrical resistance of the removed insulation materials, improvement in the means for joining the two remaining ends of the shielding sleeve, if such shielding is used, and maintenance of proper concentricity between replacement shielding sleeve and conductor. A further purpose is to make such an improved splice simply, cheaply, and expeditiously, so as to avoid the relatively long labor time previously characteristic of cable splicing procedures of this type.

BRIEF SUMMARY OF THE INVENTION

The invention can best be described in connection with the accompanying drawings, and will be referred to only briefly at this point in the specification. Suffice it to say here that it involves enclosure of the splice in an outer cable jacket, which is taped to the cable on opposite sides of the splice. This jacket then has introduced thereto a polyurethane, epoxy, or equivalent plastic potting material, which flows into the jacket space around the cable, inwardly through a replacement conductive, open-mesh, screen or braid sleeve which has been installed between cut off ends of the origianl shielding sleeve, if any, and fills the cavity inside the jacket, inside and outside the last-mentioned sleeve. In short, the splice is encapsulated within the outer jacket by a solid polyurethane or equivalent plastic filler material which is set up therein, both outside and inside the copper mesh shielding sleeve. The filler material is a material of high dielectric strength and high electrical resistance.

BRIEF DESCRIPTION OF THE DRAWINGS

FIG. 1 is a longitudinal sectional view of a splice being made in a high voltage cable according to the present invention;

FIG. 2 is an enlarged detail of a portion of FIG. 1, with the filler material in place;

FIG. 3 is a perspective of a polyurethane helix preferably used in the splice; and FIG. 4 is a perspective view showing a modification of one part of the splice of FIG. 1.

DESCRIPTION OF A PREFERRED ILLUSTRATIVE EMBODIMENT

FIG. 1 shows a spliced cable according to one embodiment of the invention. The cable, to either side of the splice, will be seen to embody a heavy gauge center conductor 10, a conventional primary insulation sleeve 11 about conductor 10, an open-mesh electrically conductive shielding screen, braid or the like 12 surrounding insulation 11, and an outer cable insulation jacket 13 just outside the screen 12. At the splice, the two ends of the copper conductor have been cut off with butt ends 14. They are shown to be joined by a common type of electrically conductive externally cylindrical connector sleeve 15 composed of copper or aluminum, and indented into the side of the end portions of the abutting conductors, as at 16, in a manner to afford a very tight mechanical and electrical connection.

The insulation 11 will be seen to have been stripped back and tapered, as at 18. The shielding screen 12 has been cut back say two inches further as to point 20, and the outer cable insulation jacket 13 is cut back another half inch, or approximately so, as at 22.

In the making of the splice, a copper or aluminum open-mesh replacement or shielding sleeve 24 is to be installed in place of the cut-away shield sleeve material 12, in an overlapping relation over the exposed end portions of the stripped back shielding sleeve 12, and soldered or affixed thereto. It is known to be necessary for proper electrical stress distribution that this screen be positioned with very good concentricity relative to the conductors 10; and to accomplish this, I use a helically formed relatively flexible spacer 30 of a suitable high dielectric material, preferably an inert plastic material such as polyurethane, epoxy or the like. This spacer, which is to fit snugly over the connector 15, being in the nature of a spring, can readily be flexed and worked or wound into proper position on the connector sleeve 15. It can be applied easily after the connector is in place. The successive turns of the helix readily spread so as to go on over the connector sleeve.

The shielding sleeve 24 is thus fitted, preferably somewhat tautly, over the helical spacer. The sleever 24 can be formed from a rectangular piece of copper or aluminum screen cut to the proper dimensions so that it will overlap the ends of the screens 12 of the two cables, and a longitudinal seam then formed along the longitudinal edges of the rolled rectangle by soldering. Or the screen can be made initially into a sleeve of a diameter such that it can be just snugly slid onto the outer jacket 13 of one or the other of the two cable ends to be spliced. Then, after application of the helix 30, the sleeve 24 can be slid back to the position of FIGS. 1 and 2, and soldered in place, positioned concentrically with the conductor 10.

Before the splice is made, an outer tubular and flexible splice jacket 40, preferably composed of polyvinyl chloride, or other suitable material, preferably one of the plastics, of a thickness typically of 60 mils, is slipped on over one of the cable ends, and kept there while the conductors are connected, and the helical spacer 30 and screen sleeve 24 are installed. The splice jacket 40 can, for example, be approximately ½ inch greater in diameter than the exterior cable jacket. The splice jacket 40 is then moved into a centered position, and taped tightly to the exterior cable jacket at both ends, as illustrated, using electrical plastic tape, as at 42. At one end, a small, flexible plastic vent tube 43 is secured under the tape to provide for release of air as liquid plastic filler material is filled into the jacket.

The preferred filler material is a plastic substance which, after preparing in a liquid mix, will set up as a solid in a few minutes time, and which has high dielectric strength and high electrical resistance. Commercially available and very well known polyurethane is ideal for the purpose, and will set up, ready for service, in about ten minutes after being introduced into the jacket. Other inert plastic materials, such as an epoxy, can be used, as can any material which is inert, and of good electrical resistance and high dielectric quality.

To provide for introduction of the filler, the splice jacket 40 is fitted with a filler inlet or valve 44, adapted to be closed by a cap 45.

The preferred polyurethane encapsulating material may be any commercial mix whose ingredients, after mixing, will set up solidly. There are well-known commercially available pre-measured and pre-packaged materials which require only slight mixing, and which are perfectly suited to the task, and these may be easily selected and prepared by those skilled in the art. The liquid mixed materials may then be introduced into the splice jacket 40 through inlet 44, using conventional injection equipment. For example, one commercially available package comes equipped with a hypodermic type dispenser. With this dispenser the liquid polyurethane can be forced inside the jacket. As the filler completely encapsulates the complete interior of the jacket, air is forced out throug the vent tube. The jacket is filled completely until the filler encapsulating material starts to come out the vent tube. At this time the dispenser is removed, the inlet filler or valve capped and the whole assembly allowed to stand for approximately ten minutes. At the end of this time the polyurethane is completely cured and the splice is ready for service.

The helical spacer 30 positions the screen shielding sleeve concentrically and evenly spaced away from the conductor. The spacer and encapsulating splice-jacket filler material when both are composed of polyuretheane have the same dielectric strength which gives this type of insulating outstanding characteristics for high voltage applications.

The liquid polyurethane when injected into the inlet tube flows through the conductive shielding screen, through and around the helical spacer 30 and insures total encapsulation from end to end of all interior parts encased within the splice jacket. l Using the preferred material, polyurethane, the splice is both surrounded and filled in with a solid integral insulation body of high dielectric strength and high electrical resistance.

The splice is thus not subject ot leakage current, nor to spark-over, arcing or any other kind of electrical breakdown. It is quickly and inexpensively made, and is not only a superior splice, but can be made both more quickly and more inexpensively than splices heretofore known.

In the case of unshielded cable, the conductive screen 12 is omitted, as is the helix 30, and the insulation 11 may be the outer jacket of the cable. The splice jacket will in this case be placed on over the insulation 11.

FIG. 4 shows a modification of the conductive mesh sleeve used in splicing the shielding screen. The mesh screen 24a in this case has a longitudinal split 54, and it is bonded inside a split semi-rigid polyvinyl chloride or other suitable plastic sleeve 55, the splits in the screen and in the sleeve 55 coinciding. The sleeve 55 has enough flexibility that it can be opened up wide enough at its split to go on over the helical spacer.

The ends of the copper mesh sleeve 24a are soldered to the ends of the screen 12 as before. The sleeve 55 has holes 57 through which the polyurethane can reach the screen material. The split sleeve 55 has an outside diameter such that there remains a substantial annular space between it and the jacket 40 for reception and passage of the injected polyurethane. This arrangement facilitates the installation of the copper mesh splicing sleeve, allowing it to be placed on much more rapidly, and facilitates a more concentric splice.

What is claimed is:

1. A splice of the proximate end portions of two shielded high voltage cables each having a conductor, primary insulation in a layer around said conductor, an electrically conductive shield in the form of a sleeve around said primary insulation, and an outer cable jacket around said shield, the primary insulation on each of said conductors and said shield being stripped back to expose an end portion of the conductor, and the outer cable jacket being stripped back far enough to expose an end portion of the shield, comprising:
   an electrically conductive cable connector sleeve connecting the exposed end portions of conductors;
   an electrically conductive open-mesh shielding splice sleeve around said conductors, said splice sleeve being electrically bonded at opposite ends to the exposed end portions of said shields of said cables;
   an insulation spacer comprising a flexible helix mounted on said connector sleeve, said spacer having an exterior cylindric surface concentric with said conductors and supporting said splice sleeve in a position concentric with said conductors;
   a tubular splice jacket surrounding said cable jackets, with its opposite ends joined thereto on opposite sides of said splice, said tubular splice jacket being annularly spaced from said cable jackets between its ends; and
   a body of electrically insulating filler material, of high dielectric strength and high electrical resistance solidly filling the otherwise open space inside said tubular splice jacket, and continuing through the open-mesh splice sleeve to fill all interior open space therewithin.

2. The splice of claim 1, wherein said helix is composed of polyurethane.

3. A splice of the proximate end portions of two shielded high voltage cables each having a conductor, primary insulation in a layer around said conductor, an electrically conductive shield in the form of a sleeve around said primary insulation, and an outer cable jacket around said shield, the primary insulation on each of said conductors and said shield being stripped back to expose an end portion of the conductor, and the outer cable jacket being stripped back far enough to expose an end portion of the shield, comprising:

- an electrically conductive cable connector sleeve connecting the exposed end portions of the conductors;
- an electrically conductive open-mesh shielding splice sleeve around said conductors, said splice sleeve being electrically bonded at opposite ends to the exposed end portions of said cables, and said open-mesh splice sleeve being longitudinally split, and being bonded to the inside of a semi-flexible tube of plastic material, said tube being longitudinally split in coincidence with the split in said splice sleeve, and said tube being apertured to give access of a filler material to the exterior of the splice sleeve;
- a tubular splice jacket surrounding said cable jackets, with its opposite ends joined thereto on opposite sides of said splice, said tubular splice jacket being annularly spaced from said cable jackets between its ends; and
- a body of electrically insulating filler material, of high dielectric strength and high electrical resistance solidly filling the otherwise open space inside said tubular splice jacket, and continuing through the open-mesh splice sleeve to fill all interior open space therewithin.

* * * * *